(12) United States Patent
Zhang et al.

(10) Patent No.: US 11,785,435 B2
(45) Date of Patent: Oct. 10, 2023

(54) METHODS AND APPARATUSES FOR CAPABILITY EXPOSURE

(71) Applicant: Telefonaktiebolaget LM Ericsson (publ), Stockholm (SE)

(72) Inventors: Fengpei Zhang, Guangzhou (CN); Yun Zhang, Beijing (CN); Minyi Wang, Guangzhou (CN); Jingrui Tao, Guangzhou (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 49 days.

(21) Appl. No.: 17/054,477

(22) PCT Filed: May 11, 2018

(86) PCT No.: PCT/CN2018/086576
§ 371 (c)(1),
(2) Date: Nov. 10, 2020

(87) PCT Pub. No.: WO2019/213954
PCT Pub. Date: Nov. 14, 2019

(65) Prior Publication Data
US 2021/0058755 A1    Feb. 25, 2021

(51) Int. Cl.
*H04W 4/70* (2018.01)
*H01M 10/42* (2006.01)
(Continued)

(52) U.S. Cl.
CPC ......... *H04W 4/70* (2018.02); *H01M 10/4257* (2013.01); *H04L 41/147* (2013.01); *H04L 67/12* (2013.01); *H04W 24/08* (2013.01)

(58) Field of Classification Search
CPC ... H04W 4/70; H04W 24/08; H04M 10/4257; H04L 41/147; H04L 67/12
(Continued)

(56) References Cited

U.S. PATENT DOCUMENTS 9,179,009 B1    11/2015  Subramanian et al.
9,924,503 B2 *   3/2018  Kim ................... H04L 45/7453
(Continued)

FOREIGN PATENT DOCUMENTS

CN      103475680 A     12/2013
WO      2017119802 A1    7/2017
WO      2017126892 A1    7/2017

OTHER PUBLICATIONS

International Search Report and the Written Opinion of the International Searching Authority, issued in corresponding International Application No. PCT/CN2018/086576, dated Jan. 30, 2019, 9 pages.
(Continued)

*Primary Examiner* — Mong-Thuy T Tran
(74) *Attorney, Agent, or Firm* — Rothwell, Figg, Ernst & Manbeck, P.C.

(57) ABSTRACT

Methods and apparatuses for capability exposure are disclosed for a wireless communication system. According to an embodiment, a network exposure node receives from a server a request for subscribing to a monitoring report that can be enabled by an operator node based at least on a capability of at least one non-3GPP operator asset. The network exposure node obtains the monitoring report from the operator node and sends the monitoring report to the server. The monitoring report may be related to battery lifetime predicted for a user equipment.

20 Claims, 10 Drawing Sheets

(51) Int. Cl.
*H04L 41/147* (2022.01)
*H04L 67/12* (2022.01)
*H04W 24/08* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 10,205,633 | B2* | 2/2019 | Kim | H04W 24/08 |
| 10,237,847 | B2* | 3/2019 | Jain | H04W 68/005 |
| 11,038,841 | B2* | 6/2021 | Palnati | H04L 63/0823 |
| 11,349,938 | B2* | 5/2022 | Joseph | H04W 48/08 |
| 11,445,569 | B2* | 9/2022 | Sun | H04W 4/08 |
| 2014/0134996 | A1* | 5/2014 | Barclay | G06F 9/4881 |
| | | | | 455/422.1 |
| 2015/0289078 | A1* | 10/2015 | Kim | H04W 8/02 |
| | | | | 455/422.1 |
| 2015/0347204 | A1* | 12/2015 | Stanley-Marbell | G06F 9/4843 |
| | | | | 719/318 |
| 2016/0044651 | A1* | 2/2016 | Lu | H04W 4/70 |
| | | | | 370/329 |
| 2016/0142860 | A1* | 5/2016 | Kim | H04W 80/02 |
| | | | | 455/435.1 |
| 2016/0277243 | A1* | 9/2016 | Kim | H04L 41/0816 |
| 2017/0118667 | A1* | 4/2017 | Mattsson | H04W 64/00 |
| 2017/0311304 | A1* | 10/2017 | Lu | H04W 4/70 |
| 2017/0347283 | A1* | 11/2017 | Kodaypak | H04W 24/08 |
| 2017/0353819 | A1* | 12/2017 | Yin | H04W 72/1284 |
| 2018/0176979 | A1* | 6/2018 | Ryu | H04W 68/02 |
| 2018/0263013 | A1* | 9/2018 | Jain | H04W 8/06 |
| 2018/0332636 | A1* | 11/2018 | Lu | H04W 76/12 |
| 2019/0028337 | A1* | 1/2019 | Ryu | H04W 8/02 |
| 2019/0028925 | A1* | 1/2019 | Chun | H04W 28/04 |
| 2019/0149413 | A1* | 5/2019 | Kim | H04W 24/08 |
| | | | | 370/252 |
| 2019/0254016 | A1* | 8/2019 | Lu | H04W 24/08 |
| 2020/0022008 | A1* | 1/2020 | Magee | H04W 24/08 |

OTHER PUBLICATIONS

3GPP TS 23.682, V13.10.0 (Mar. 2018), 3rd Generation Partnership Project; Technical Specification Group Services and System Aspects; Architecture enhancements to facilitate communications with packet data networks and applications (Release 13), Mar. 2018, 93 pages.

3GPP TS 23.682, V15.2.0 (Sep. 2017), 3rd Generation Partnership Project; Technical Specification Group Services and System Aspects; Architecture enhancements to facilitate communications with packet data networks and applications (Release 15), Sep. 2017, 122 pages.

3GPP TS 29.122 V0.4.0 (Dec. 2017), 3rd Generation Partnership Project; Technical Specification Group Core Network and Terminals; T8 reference point for Northbound APIs (Release 15), Dec. 2017, 119 pages.

3GPP TS 23.682, V15.4.0 (Mar. 2018), 3rd Generation Partnership Project; Technical Specification Group Services and System Aspects; Architecture enhancements to facilitate communications with packet data networks and applications (Release 15), Mar. 2018, 124 pages.

* cited by examiner

METHODS AND APPARATUSES FOR CAPABILITY EXPOSURE

CROSS REFERENCE TO RELATED APPLICATION(S)

This application is a 35 U.S.C. § 371 National Phase Entry Application from PCT/CN2018/086576, filed May 11, 2018, designating the United States, the disclosure of which is incorporated herein by reference in its entirety.

TECHNICAL FIELD

Embodiments of the disclosure generally relate to wireless communication, and, more particularly, to methods and apparatuses for capability exposure.

BACKGROUND

This section introduces aspects that may facilitate better understanding of the present disclosure. Accordingly, the statements of this section are to be read in this light and are not to be understood as admissions about what is in the prior art or what is not in the prior art.

Service capability exposure function (SCEF) is a key entity within 3rd generation partnership project (3GPP) architecture for service capability exposure. SCEF provides a means to securely expose services and capabilities provided by 3GPP network interfaces through application programming interfaces (APIs) to application servers. The exposed services and capabilities may generally take the form of monitoring events (MONTEs). They are intended for monitoring specific events in 3GPP systems and making the event information available through SCEF.

3GPP has defined some event types such as user equipment (UE) reachability, loss of connectivity, location of UE, communication failure, number of UEs present in geographical area, availability after downlink data notification (DDN) failure, change of international mobile subscriber identification number (IMSI)-international mobile equipment identity (IMEI) software version (SV) association, and roaming status. These monitoring events may be detected from home subscriber server (HSS) or mobility management entity (MME) or policy and charging rules function (PCRF).

For example, 3GPP technical specification (TS) 23.682 defines a procedure about how SCEF exposes 3GPP network functions, such as HSS or MME or PCRF monitoring event functions. The defined procedure may comprise four steps as shown in FIG. 1. At step 101, service capability server (SCS) or application server (AS) sends a monitoring request to SCEF. At step 102, SCEF handles and routes the monitoring request to the related network function such as HSS or MME or PCRF. At step 103, HSS or MME or PCRF responds with a monitoring indication. At step 104, SCEF sends a monitoring response to SCS or AS.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to improve the capability exposure.

According to one aspect of the disclosure, there is provided a method implemented at a network exposure node. The method comprises receiving from a server a request for subscribing to a monitoring report that can be enabled by an operator node based at least on a capability of at least one non-3GPP operator asset. The method further comprises obtaining the monitoring report from the operator node. The method further comprises sending the monitoring report to the server.

In this way, the capabilities or their derivatives of non-3GPP operator assets can be exposed.

In an embodiment of the disclosure, the monitoring report is related to a UE.

In an embodiment of the disclosure, the monitoring report is related to battery lifetime predicted for the UE.

In an embodiment of the disclosure, the request indicates a time threshold. The monitoring report is triggered when the predicted battery lifetime meets the time threshold.

In an embodiment of the disclosure, the monitoring report indicates the a current predicted battery lifetime.

In an embodiment of the disclosure, the request comprises a data structure "MonitoringEventSubscription" having an attribute "monitoringType" set to "Device Battery Lifetime Prediction". The monitoring report comprises a data structure "MonitoringEventNotification" having a parameter "predictedDeviceBatteryLifetime" in "monitoringEventReports" data type, the parameter "predictedDeviceBatteryLifetime" being set to the predicted battery lifetime.

In an embodiment of the disclosure, the UE is one of: a low power wide area (LPWA) device, a narrowband Internet of things (NB-IoT) device, and a category-M1 (CAT-M1) device.

According to another aspect of the disclosure, there is provided a method implemented at an operator node. The method comprises receiving from a network exposure node a request for subscribing to a monitoring report that can be enabled based at least on a capability of at least one non-3GPP operator asset. The method further comprises obtaining, from the at least one non-3GPP operator asset, data related to the monitoring report. The method further comprises generating the monitoring report based at least on the obtained data. The method further comprises sending the monitoring report to the network exposure node.

In an embodiment of the disclosure, the at least one non-3GPP operator asset is one of or any combination of: a device management system, a traffic log system, a mobile location based system, and a business or operation supporting system.

In an embodiment of the disclosure, the monitoring report is related to battery lifetime predicted for a UE, and the at least one non-3GPP operator asset comprises a device management system and a traffic log system.

In an embodiment of the disclosure, obtaining the data comprises obtaining historical power consumption data of a plurality of reference UEs. Obtaining the data comprises obtaining a current power consumption data of the UE. Generating the monitoring report comprises generating a forecasting model for battery lifetime from the historical power consumption data of the plurality of reference UEs based on machine learning. Generating the monitoring report comprises determining predicted batter lifetime for the UE based on the forecasting model and the current power consumption data of the UE.

In an embodiment of the disclosure, obtaining the data further comprises obtaining historical power consumption data of the UE. The forecasting model is generated further from the historical power consumption data of the UE based on machine learning.

In an embodiment of the disclosure, an amount of historical power consumption data of the UE is smaller than or equal to a predetermined amount threshold. The current power consumption data of the UE is a current battery level of the UE.

In an embodiment of the disclosure, an amount of historical power consumption data of the UE is greater than a predetermined amount threshold. The current power consumption data of the UE comprises current battery level and the corresponding behavior pattern of the UE. The historical power consumption data of the UE comprises historical battery levels, corresponding battery usage time values and corresponding behavior patterns of the UE.

In an embodiment of the disclosure, the behavior pattern of the UE comprises one of or any combination of: a voltage value in a predetermined time period; a current value in the predetermined time period; a number of messages in the predetermined time period; a number of events in the predetermined time period; a power saving mode (PSM) duration in the predetermined time period; and a wakeup duration in the predetermined time period.

In an embodiment of the disclosure, the historical power consumption data of a reference UE comprises historical battery levels and corresponding battery usage time values of the reference UE.

In an embodiment of the disclosure, when a time threshold is indicated in the request, at least the determining of the predicted batter lifetime is performed until the predicted battery lifetime meets the time threshold. When no time threshold is indicated in the request, the determining of the predicted batter lifetime is performed once.

According to another aspect of the disclosure, there is provided a method implemented at a server. The method comprises sending to a network exposure node a request for subscribing to a monitoring report that can be enabled based at least on a capability of at least one non-3GPP operator asset. The method further comprises receiving the monitoring report from the network exposure node.

In an embodiment of the disclosure, the monitoring report is related to battery lifetime predicted for a UE.

According to another aspect of the disclosure, there is provided a network exposure node. The network exposure node comprises at least one processor and at least one memory. The at least one memory contains instructions executable by the at least one processor, whereby the network exposure node is operative to receive from a server a request for subscribing to a monitoring report that can be enabled by an operator node based at least on a capability of at least one non-3GPP operator asset. The network exposure node is further operative to obtain the monitoring report from the operator node. The network exposure node is further operative to send the monitoring report to the server.

In an embodiment of the disclosure, the network exposure node is operative to perform the method according to the above aspect.

According to another aspect of the disclosure, there is provided an operator node. The operator node comprises at least one processor and at least one memory. The at least one memory contains instructions executable by the at least one processor, whereby the operator node is operative to receive from a network exposure node a request for subscribing to a monitoring report that can be enabled based at least on a capability of at least one non-3GPP operator asset. The operator node is further operative to obtain, from the at least one non-3GPP operator asset, data related to the monitoring report. The operator node is further operative to generate the monitoring report based at least on the obtained data. The operator node is further operative to send the monitoring report to the network exposure node.

In an embodiment of the disclosure, the operator node is operative to perform the method according to the above aspect.

According to another aspect of the disclosure, there is provided a server. The server comprises at least one processor and at least one memory. The at least one memory contains instructions executable by the at least one processor, whereby the server is operative to send to a network exposure node a request for subscribing to a monitoring report that can be enabled based at least on a capability of at least one non-3GPP operator asset. The server is further operative to receive the monitoring report from the network exposure node.

In an embodiment of the disclosure, the server is operative to perform the method according to the above aspect.

According to another aspect of the disclosure, there is provided a computer program product. The computer program product comprises instructions which when executed by at least one processor, cause the at least one processor to perform the method according to the above aspect.

According to another aspect of the disclosure, there is provided a computer readable storage medium. The computer readable storage medium comprises instructions which when executed by at least one processor, cause the at least one processor to perform the method according to the above aspect.

According to another aspect of the disclosure, there is provided a network exposure node. The network exposure node comprises a reception module for receiving from a server a request for subscribing to a monitoring report that can be enabled by an operator node based at least on a capability of at least one non-3GPP operator asset. The network exposure node further comprises an obtaining module for obtaining the monitoring report from the operator node. The network exposure node further comprises a sending module for sending the monitoring report to the server.

According to another aspect of the disclosure, there is provided an operator node. The operator node comprises a reception module for receiving from a network exposure node a request for subscribing to a monitoring report that can be enabled based at least on a capability of at least one non-3GPP operator asset. The operator node further comprises an obtaining module for obtaining, from the at least one non-3GPP operator asset, data related to the monitoring report. The operator node further comprises a generation module for generating the monitoring report based at least on the obtained data. The operator node further comprises a sending module for sending the monitoring report to the network exposure node.

According to another aspect of the disclosure, there is provided a server. The server comprises a sending module for sending to a network exposure node a request for subscribing to a monitoring report that can be enabled based at least on a capability of at least one non-3GPP operator asset. The server further comprises a reception module for receiving the monitoring report from the network exposure node.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

As mentioned above, the current monitoring event solution is based on SCEF exposure and all event types are related to the 3GPP network (such as HSS or MME or PCRF) functions or capabilities. Currently, there is no interaction method for SCEF to expose the telecom assets' capabilities beyond the 3GPP network functions. These capabilities or their derivatives of non-3GPP telecom (or operator) assets may be very useful for application servers.

For example, for low power wide area (LPWA) device such as narrowband Internet of things (NB-IoT) device, category-M1 (CAT-M1) device, or the like, an application server may need to monitor the device battery lifetime, which is a critical indicator for the device operation. Based on the monitored battery lifetime, the application server may trigger an action towards maintenance stuff for site operation, e.g. changing the device battery, or planning the phasing out of the device, or improving the application of the device for saving energy consumption when the battery level is going to be low, or the like. However, currently, the device can only report key device resource objects such as battery level (percentage of remaining energy of the battery), but there is no method or apparatus to predict the device battery lifetime. In addition, if the telecom network or LPWA device changes the radio network parameter such as power saving mode (PSM) or extended discontinuous reception (eDRX), there is no method or apparatus to evaluate how it will impact the power consumption of the device and to predict the latest battery lifetime for the device.

The present disclosure proposes improved solutions for capability exposure. Hereinafter, the solutions will be described in detail with reference to FIGS. 2-13.

Figure 1:
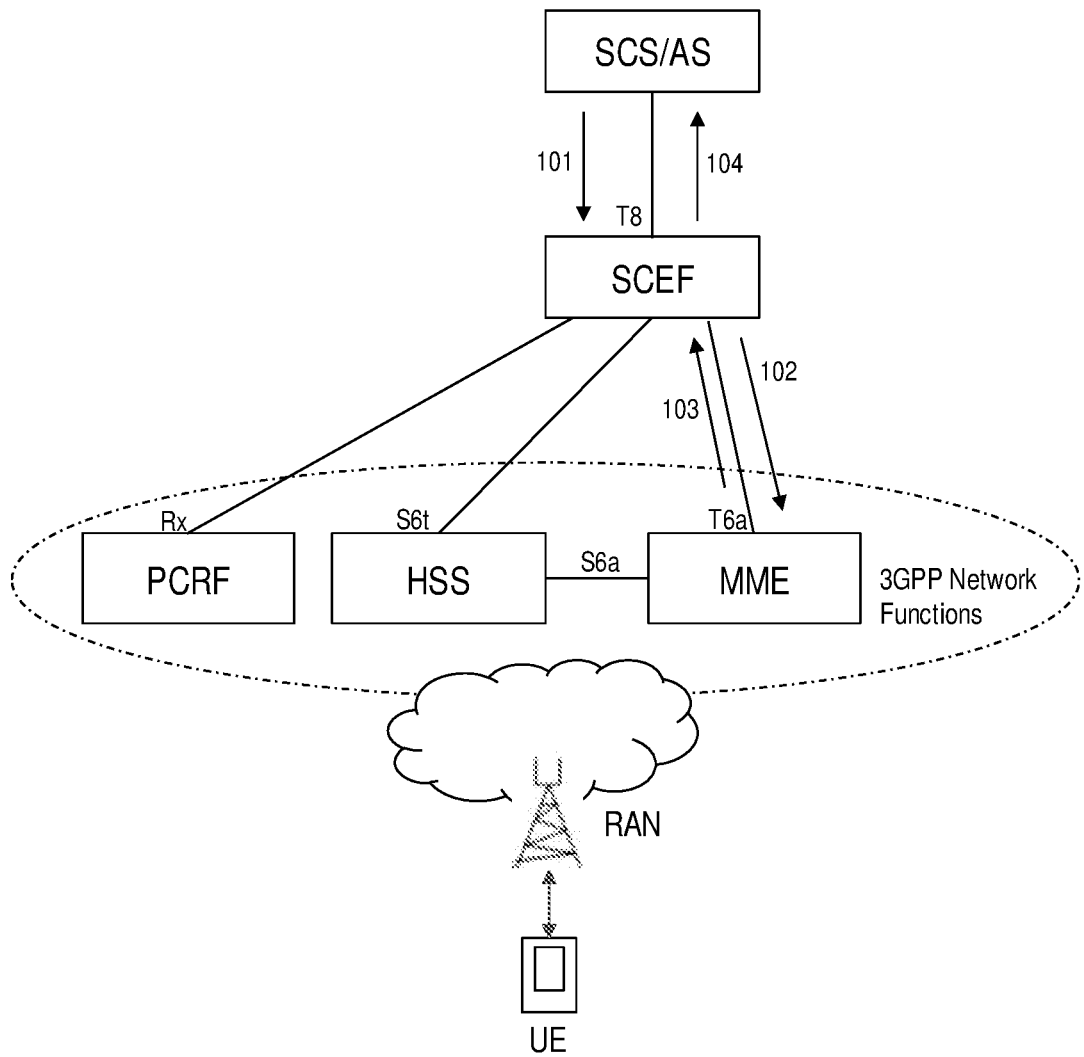
FIG. 1 is a diagram showing an existing architecture for capability exposure.
Figure 2:
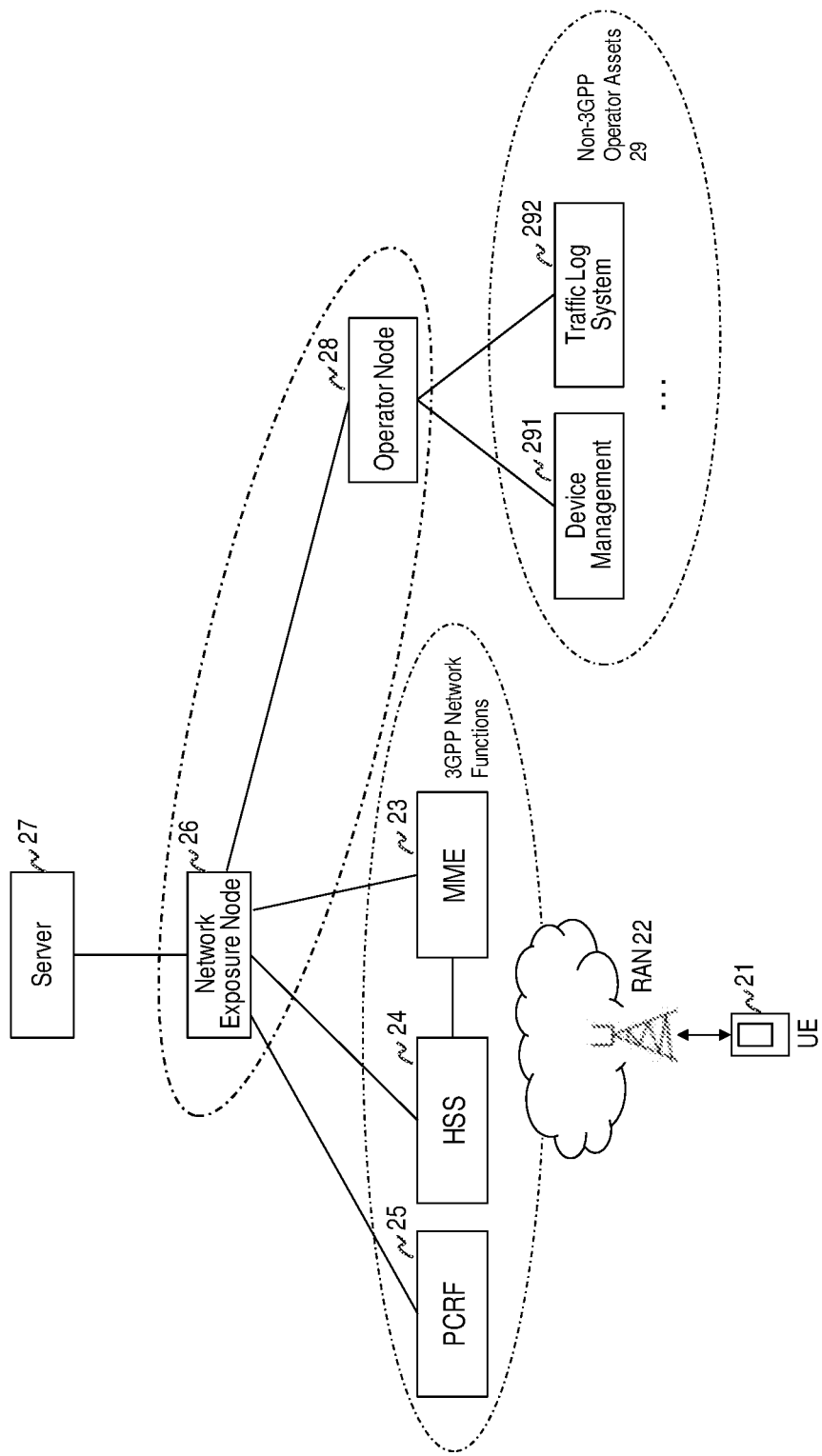
FIG. 2 is a diagram showing an exemplary wireless communication system according to an embodiment of the disclosure.

FIG. 2 is a diagram showing an exemplary wireless communication system according to an embodiment of the disclosure. As shown, the wireless communication system comprises a user equipment (UE) 21, a radio access network (RAN) 22, a mobility management entity (MME) 23, a home subscriber server (HSS) 24, a policy and charging rules function (PCRF) 25, a network exposure node 26, a server 27, an operator node 28 and non-3GPP operator assets 29. Note that the number of each entity mentioned above may be more than one.

The UE 21 can communicate through a radio access communication link with the RAN 22. The communication may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

The UE may also be referred to as, for example, mobile station, mobile unit, subscriber station, access terminal, terminal device, or the like. It may refer to any end device that can access a wireless communication network and receive services therefrom. By way of example and not limitation, the UE may include portable computers, image capture terminal devices such as digital cameras, gaming terminal devices, music storage and playback appliances, a mobile phone, a cellular phone, a smart phone, a tablet, a wearable device, a personal digital assistant (PDA), or the like.

In an Internet of things (IoT) scenario, a UE may represent a machine or other device that performs monitoring and/or measurements, and transmits the results of such monitoring and/or measurements to another UE and/or a network equipment. In this case, the UE may be a machine-to-machine (M2M) device, which may, in a 3GPP context, be referred to as a machine-type communication (MTC) device. Particular examples of such machines or devices may include sensors, metering devices such as power meters, industrial machinery, bikes, vehicles, or home or personal appliances, e.g. refrigerators, televisions, personal wearables such as watches, and so on.

The RAN 22 may include, for example, a universal mobile telecommunications system (UMTS) terrestrial RAN (UTRAN), a global system for mobile communication (GSM)/enhanced data rate for GSM evolution (EDGE) RAN (GERAN), and/or an evolved universal terrestrial RAN (E-UTRAN). The UTRAN and the GERAN can each include radio network controller (RNC) nodes to control communications through radio base stations providing radio access communication links to UEs that are within their respective communication service cells. The E-UTRAN can include radio base station nodes (eNodeBs) that can provide the combined functionality of the RNC nodes and base stations of the UTRAN and the GERAN.

The MME 23, the HSS 24 and the PCRF 25 are core network nodes mainly involved in the exposure of 3GPP network functions, that is, the services/capabilities provided by 3GPP network. The MME 23 can carry out mobility management of the UE 21. The HSS 24 can manage subscriber information of the UE 21. The PCRF 25 can determine a policy and charging control (PCC) rule to be applied to a service data flow of the UE 21. Note that these core network nodes are merely exemplary examples and may be replaced by those having the same or similar functions.

The network exposure node 26 can expose both the 3GPP network functions and the capabilities or their derivatives of the non-3GPP operator assets 29 by providing access to these functions and capabilities through homogenous interfaces. For example, the network exposure node 26 may take the form of service capability exposure function (SCEF), network exposure function (NEF) in 5G/new radio (NR), or any other similar entity. The homogenous interfaces may be network application programming interfaces (APIs) defined by open mobile alliance (OMA), GSM alliance (GSMA) and possibly other standardization bodies. The implementing details for the exposure of the 3GPP network functions have been defined by 3GPP. The capabilities or their derivatives of the non-3GPP operator assets 29 can be exposed in the form of monitoring event(s). The implementing details for the exposure of the capabilities or their derivatives of the non-3GPP operator assets 29 will be described in detail later.

The server 27 can access both the 3GPP network functions and the capabilities or their derivatives of the non-3GPP operator assets 29 through the homogenous interfaces between the network exposure node 26 and the server 27. For example, the server 27 may take the form of service capability server (SCS)/application server (AS) defined by 3GPP, or any other similar entity. The SCS/AS means either SCS or AS or both. The implementing details for accessing the 3GPP network functions have been defined by 3GPP. The implementing details for accessing the capabilities or their derivatives of the non-3GPP operator assets 29 will be described in detail later.

The operator node 28 can enable monitoring event(s) based at least on the capability(ies) of one or more of the non-3GPP operator assets 29 such that the capability(ies) or the derivative(s) thereof can be exposed by the network exposure node 26. Thus, the operator node 28 may also be called as monitoring event (MONTE) enabler. Its implementing details will be described in detail later. The non-3GPP operator assets 29 refer to the operator assets which are not defined by 3GPP. As an example, as shown in FIG. 2, the non-3GPP operator assets 29 may comprise a device management system 291 and a traffic log system 292. Other examples of the non-3GPP operator assets 29 may include a mobile location based system, a business or operation supporting system, and any other existing or future developed operator assets.

Figure 3:
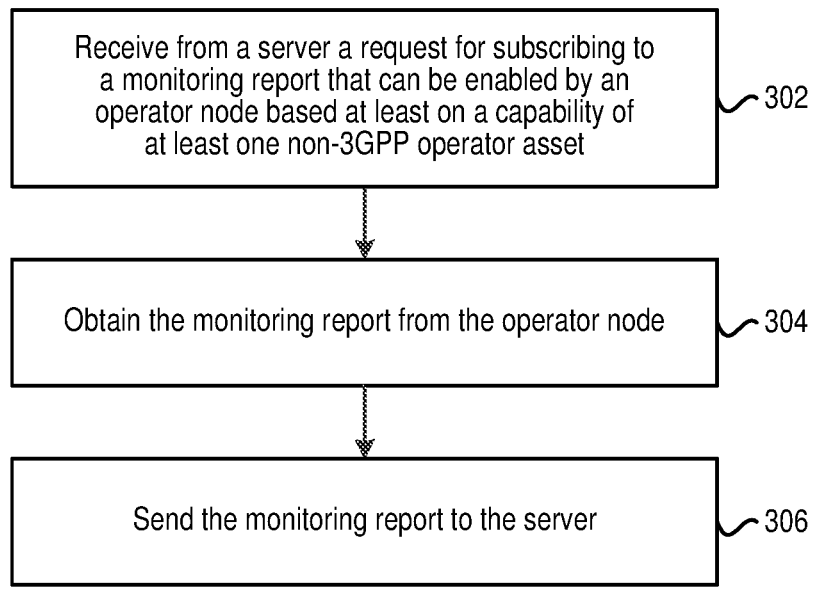
FIG. 3 is a flowchart illustrating a method implemented at a network exposure node according to an embodiment of the disclosure.

FIG. 3 is a flowchart illustrating a method implemented at a network exposure node according to an embodiment of the disclosure. As described above, the network exposure node may take the form of SCEF, NEF, or any other similar entity. At block 302, the network exposure node receives from a server a request for subscribing to a monitoring report that can be enabled by an operator node based at least on a capability of at least one non-3GPP operator asset. As described above, the server may take the form of SCS, AS, or any other similar entity. For example, the monitoring report may be related to a UE. The request may include the identity of the UE and the type of the monitoring report. The identity of the UE may include, but not limited to, mobile subscriber international ISDN number (MSISDN), external ID (e.g., device ID), or the like. The term ISDN refers to integrated services digital network. The type of the monitoring report may indicate what is to be monitored for the UE. Optionally, the request may include a condition under which to trigger the monitoring report. Optionally, the request may include information about the requesting entity for authentication, authorization and accounting. The details about how the monitoring report can be enabled by the operator node will be described later.

As an exemplary option, the monitoring report may be related to battery lifetime predicted for the UE. In this case, the UE may be a low power wide area (LPWA) device such as narrowband Internet of things (NB-IoT) device, category-M1 (CAT-M1) device, or the like. The type of the monitoring report may indicate what is to be monitored for the UE is battery lifetime predicted for the UE. Optionally, the condition for triggering the monitoring report may be expressed by a time threshold which may be specified by the requesting entity. The time threshold may be configured that the monitoring report is triggered when the predicted battery lifetime meets the time threshold. If no time threshold is specified in the request, the monitoring report may indicate the current predicted battery lifetime.

In the case where the network exposure node takes the form of SCEF, the interface between the network exposure node and the server is T8 interface which is a set of 3GPP SCEF northbound APIs and is defined in, for example, 3GPP TS 29.122. One of the APIs is called as "MonitroingEventSubscription" which has an input parameter called as "monitoringType". By adding a new value "Device Battery Lifetime Prediction" to "monitoringType", the request may be implemented as a message comprising a data structure "MonitoringEventSubscription" having an attribute "monitoringType" set to "Device Battery Lifetime Prediction". Optionally, by adding a new parameter "DeviceBatteryLifetimePredictionThreshold" to the "MonitroingEventSubscription", the request may be implemented as a message comprising a data structure "MonitoringEventSubscription" having a parameter "DeviceBatteryLifetimePredictionThreshold" set to the threshold value specified by the requesting entity.

At block 304, the monitoring report is obtained from the operator node. For example, block 304 may be implemented as two sub-blocks. At the first sub-block, the network exposure node sends to the operator node a request for subscribing to the monitoring report. For ease of description, the request sent from the server to the network exposure node may be called as the first request and the request sent from the network exposure node to the operator node may be called as the second request. The second request may include the identity of the UE and the type of the monitoring report. For example, based on the UE identity included in the first request, the network exposure node may obtain from the HSS further information as the UE identity included in the second request. The type of the monitoring report included in the second request may be the same as that included in the first request. Optionally, the second request may include a condition under which to trigger the monitoring report. At the second sub-block, the monitoring report is received from the operator node. The monitoring report may include information about the monitored result in response to the request. In the above option about battery lifetime prediction, the monitoring report may include the predicted battery lifetime for the UE. Optionally, when a time threshold is specified in the request, the predicted battery lifetime included in the received monitoring report equals the time threshold, which means the triggering condition has been satisfied. On the other hand, if no time threshold is specified in the request, the predicted battery lifetime included in the received monitoring report is the current predicted battery lifetime.

At block 306, the monitoring report is sent to the server. In the above case of SCEF, one of the 3GPP SCEF northbound APIs is called as "MonitoringEventNotification". By adding a new output parameter "predictedDeviceBatteryLifetime" (with time period value in the unit of minutes/hours/days) to "monitoringEventReports" data type, the monitoring report may be implemented as a message comprising a data structure "MonitoringEventNotification" having a parameter "predictedDeviceBatteryLifetime" in "monitoringEventReports" data type and the parameter "predictedDeviceBatteryLifetime" is set to the predicted battery lifetime. In this way, 3GPP SCEF monitoring event framework can be reused to expose the capability(ies) or the derivative(s) thereof for one or more of the non-3GPP operator assets.

Figure 4:
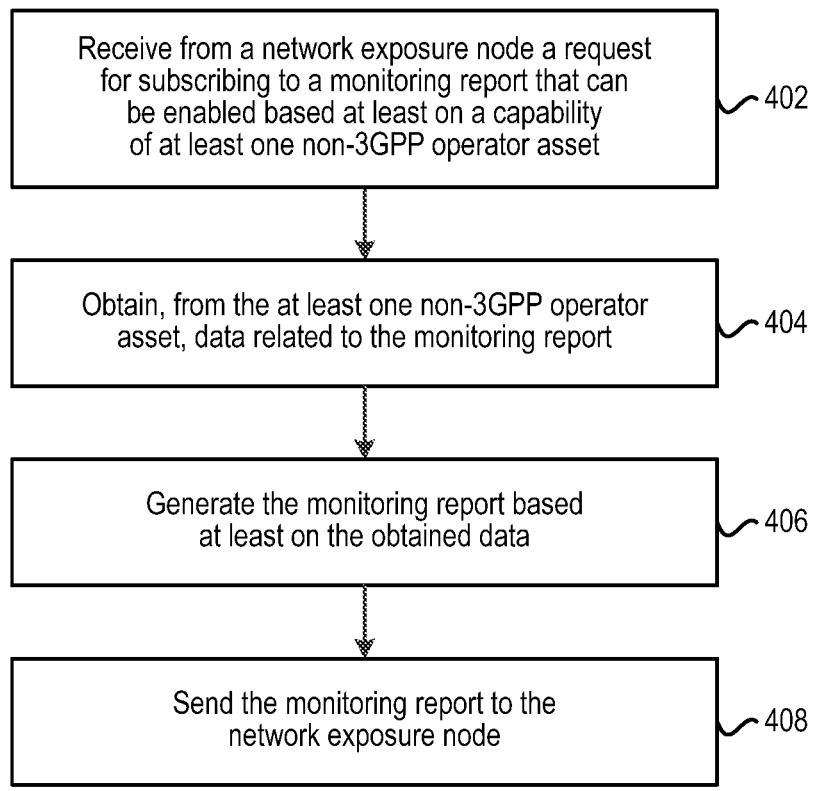
FIG. 4 is a flowchart illustrating a method implemented at an operator node according to an embodiment of the disclosure.

FIG. 4 is a flowchart illustrating a method implemented at an operator node according to an embodiment of the disclosure. As described above, the operator node may also be called as MONTE enabler. At block 402, the operator node receives from a network exposure node a request for subscribing to a monitoring report that can be enabled based at least on a capability of at least one non-3GPP operator asset. As described above, the network exposure node may take the form of SCEF, NEF, or any other similar entity. For example, the monitoring report may be related to a UE. The received request may be similar to the request sent from the server to the network exposure node. As described above, the at least one non-3GPP operator asset may comprise one of or any combination of: a device management system, a traffic log system, a mobile location based system, a business or operation supporting system, and any other existing or future developed operator assets. In the above option about battery lifetime prediction, the at least one non-3GPP operator asset may comprise a device management system and a traffic log system, and the UE may be an LPWA device such as NB-IoT device, CAT-M1 device, or the like.

At block 404, the operator node obtains, from the at least one non-3GPP operator asset, data related to the monitoring report. For example, the data related to the monitoring report may comprise one of or any combination of: various parameters of the UE monitored by the device management system, the traffic log of the UE recorded by the traffic log system, the positioning and related service data for the UE from the mobile location based system, the service data (e.g., analytic result) for the UE from the business or operation supporting system, or the like. In the above option about battery lifetime prediction, block 404 may be implemented as blocks 510-512 of FIG. 5 or blocks 710-713 of FIG. 7, which will be described in detail later.

At block 406, the monitoring report is generated based at least on the obtained data. As an example, the obtained data may be indicated in the monitoring report without being further processed. As another example, additional processing may be performed on the obtained data such that the processed data is indicated in the monitoring report. Depending on the specific application scenario, the additional processing may be one of or any combination of arithmetic processing, statistical processing, logical reasoning, data mining, machine learning, or the like. In the above option about battery lifetime prediction, block 406 may include blocks 514-516 of FIG. 5 or blocks 714-716 of FIG. 7, which will be described in detail later. At block 408, the monitoring report is sent to the network exposure node. In this way, a new operator node called MONTE enabler can be introduced to handle the new event report beyond 3GPP network functions. In the above option about battery lifetime prediction, instead of battery level only, device battery lifetime prediction and indication can be achieved. This is directly helpful for device maintenance user. It will be much easier for the user to plan maintenance activity.

Figure 5:
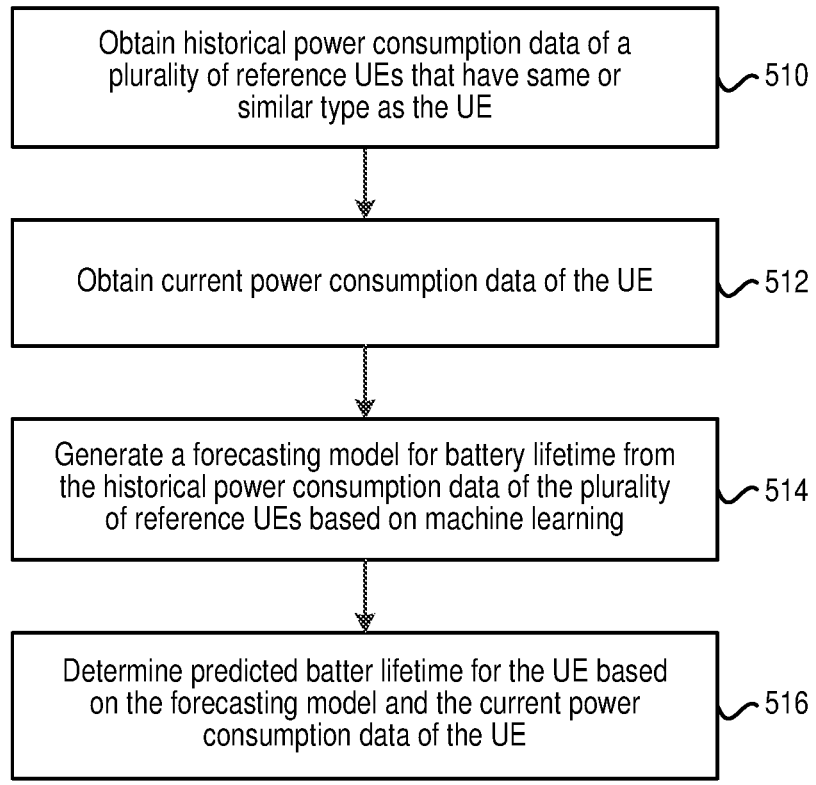
FIG. 5 is a flowchart for explaining the method of FIG. 4.

FIG. 5 is a flowchart for explaining the method of FIG. 4. The method of FIG. 5 is used for the above option about battery lifetime prediction and corresponds to the scenario that the UE is in first installation phase. That is, the amount of historical power consumption data of the UE is smaller than or equal to a predetermined amount threshold. For example, the predetermined amount threshold may correspond to a short time period such as one month. At block 510, the operator node obtains historical power consumption data of a plurality of reference UEs that have same or similar type as the UE. The similar type may refer to that the reference UE and the UE are used for the same purpose but have different models. For example, if the UE is a specific physical instance of smart meter, the reference UE may be the same physical instance of smart meter or a smart meter having a general device model. The historical power consumption data of a reference UE comprises historical battery levels and corresponding battery usage time values of the reference UE.

The historical battery levels of the reference UE may be obtained from the device management system. For example, the device management system may be a lightweight machine to machine (LwM2M) server. The UE such as LPWA device may periodically update the OMA defined LwM2M Device Object called "Battery Level" (a battery level percentage measurement such as 50%) to the LwM2M server. The battery usage time values of the reference UE may be obtained from the traffic log system. For example, the traffic log system may process the traffic log of the UE in real time to determine the battery usage time values.

Figure 6:
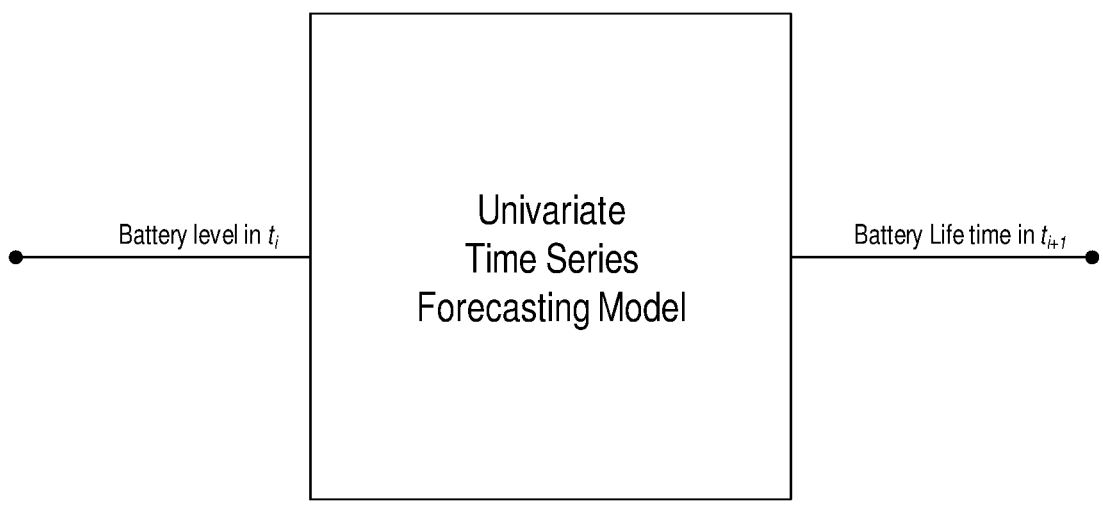
FIG. 6 shows a forecasting model corresponding to FIG. 5.

At block 512, the operator node obtains current power consumption data of the UE. Since the UE is in first installation phase, the current power consumption data of the UE may be current battery level of the UE, which may be obtained from the device management system as described above. At block 514, a forecasting model for battery lifetime is generated from the historical power consumption data of the plurality of reference UEs based on machine learning. For example, the forecasting model may be modeled as a time series forecasting problem. That is, the battery lifetime of time window $t_{i+1}$ is relevant to the feature(s) of previous time window $t_i$. Thus, the historical power consumption data of the plurality of reference UEs over multiple time windows may be used to train the forecasting model by using machine learning. Since the UE is in first installation phase, only the device battery level may be used as the variate for the forecasting model. The generated univariate time series forecasting model is shown in FIG. 6.

At block 516, predicted batter lifetime is determined for the UE based on the forecasting model and the current power consumption data of the UE. For example, the batter lifetime may be predicted by inputting the current battery level of the UE to the univariate time series forecasting model shown in FIG. 6. In this way, device type agnostic method of prediction can be provided. Even for different device types, they usually have different battery lifetime features. The same method can still be applied since machine learning approach can help establishing device type specific battery attenuation model for prediction.

Figure 7:
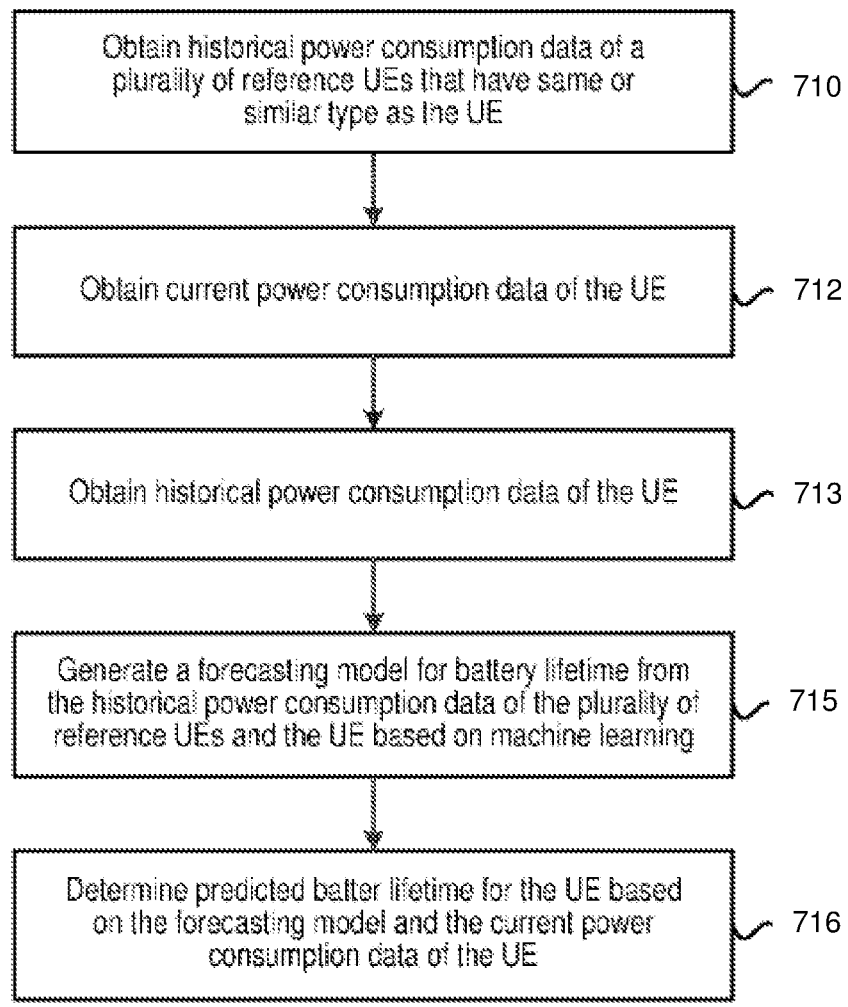
FIG. 7 is a flowchart for explaining the method of FIG. 4.

FIG. 7 is a flowchart for explaining the method of FIG. 4. The method of FIG. 7 is used for the above option about battery lifetime prediction and corresponds to the scenario that the UE is in operation phase. That is, the amount of historical power consumption data of the UE is greater than the predetermined amount threshold as described above. At block 710, the operator node obtains historical power consumption data of a plurality of reference UEs that have same or similar type as the UE. Block 710 may be similar to block 510 of FIG. 5. At block 712, the operator node obtains current power consumption data of the UE. Since the UE is in operation phase, the current power consumption data of the UE may comprise current battery level and corresponding behavior pattern of the UE.

The possible effect factors for device power consumption include power consumption on radio (e.g. radio signal strength, device on power saving mode or eDRX mode) and power consumption on UE application (e.g. the device communication interval and packet size change). Therefore, the behavior pattern of the UE may comprise one of or any combination of: a voltage value in a time window, a current value in a time window, a number of messages per type in a time window, a number of events/actions per type in a time window, a power saving mode (PSM) duration in a time window, a wakeup duration in a time window, or the like. The behavior pattern of the UE may be obtained from the traffic log system. For example, the traffic log system may process the traffic log of the UE in real time to determine the behavior pattern.

At block 713, the operator node obtains historical power consumption data of the UE. Since the UE is in operation phase, the historical power consumption data of the UE may comprise historical battery levels, corresponding battery usage time values and the corresponding behavior patterns of the UE. As described above, the battery levels of the UE may be obtained from the device management system and the corresponding battery usage time values and corresponding behavior patterns of the UE may be obtained from the traffic log system.

Figure 8:
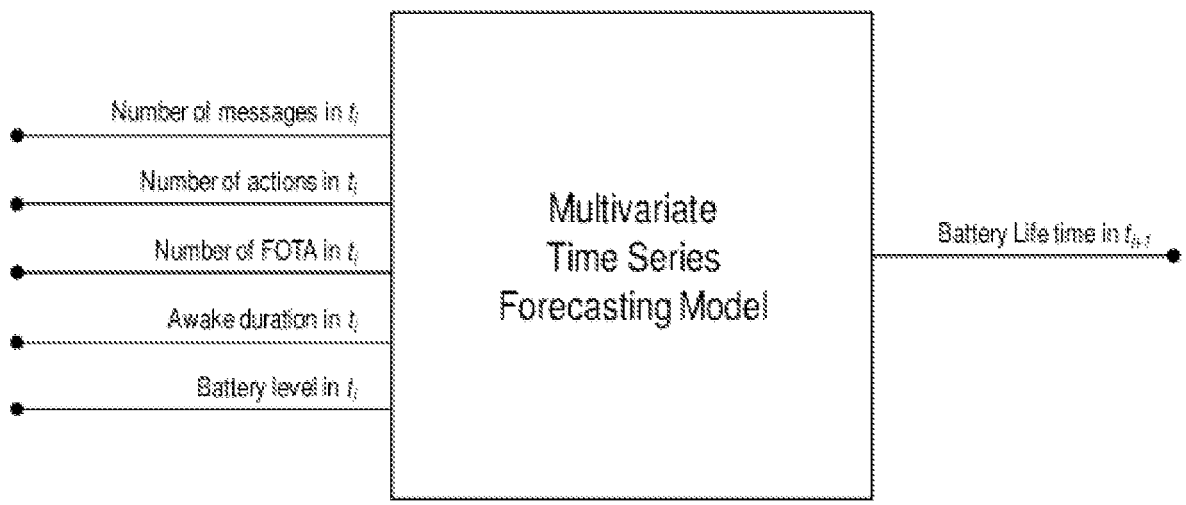
FIG. 8 shows a forecasting model corresponding to FIG. 7.

At block 714, the forecasting model is generated from the historical power consumption data of the UE and the plurality of reference UEs based on machine learning. Similar to block 514, the historical power consumption data of the UE and the plurality of reference UEs over multiple time windows may be used to train the forecasting model by using machine learning. Since the UE is in operation phase, the device battery level and behavior pattern may be used as the variates for the forecasting model. The generated multivariate time series forecasting model is shown in FIG. 8. In this way, the power consumption trends of the UE can be monitored to update the forecasting model. In case a change has happened in the UE behavior (e.g. the radio parameter change such as switching between PSM and eDRX mode, the device application logic change such as the change of frequency for sending packages), the power consumption trends after the UE behavior change can be monitored to further update the forecasting model. Thereby, the battery lifetime prediction can be improved.

At block 716, predicted batter lifetime is determined for the UE based on the forecasting model and the current power consumption data of the UE. For example, the batter lifetime may be predicted by inputting the current battery level and behavior pattern of the UE to the multivariate time series forecasting model shown in FIG. 8. In this way, environment and usage pattern agnostic method of prediction can be provided. Although the same type of devices can show different lifetime because of environment, different communication pattern, on-device software, or the like, these factors can be considered into the model as a few input features through self-learning approach.

Optionally, in the methods of FIGS. 5 and 7, if a time threshold is specified in the request, at least the determining of the predicted batter lifetime (block 516 or 716) is performed until the predicted battery lifetime meets the time threshold. On the other hand, if no time threshold is specified in the request, the determining of the predicted batter lifetime (block 516 or 716) is performed one time.

Figure 9:
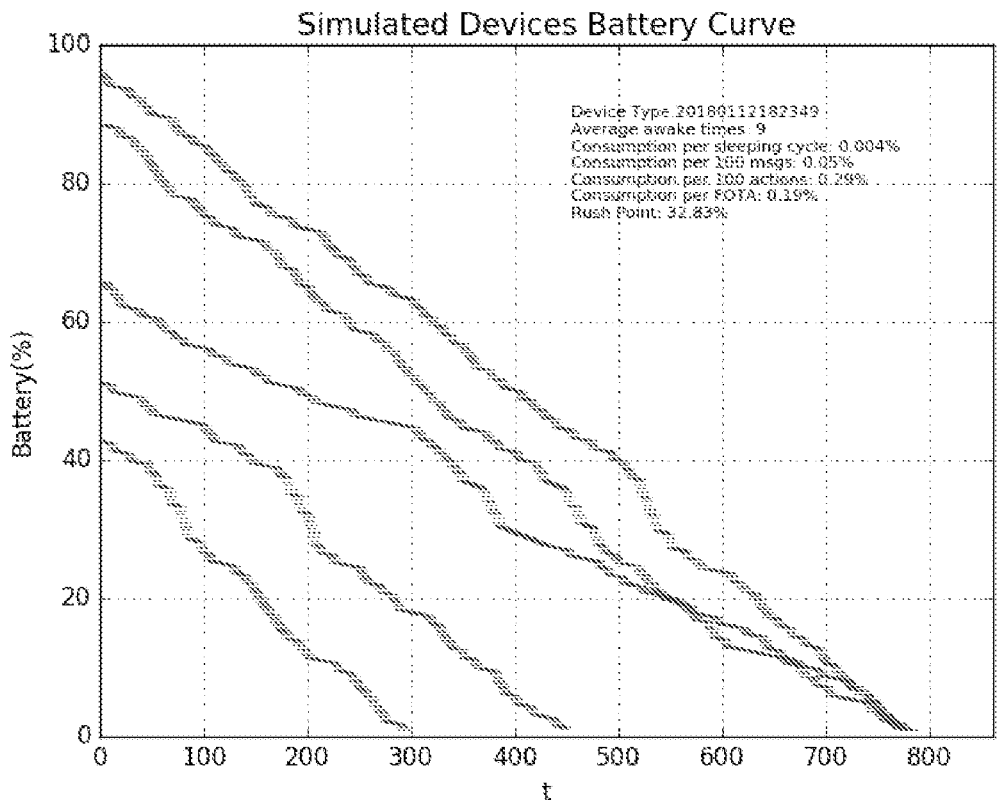
FIG. 9 shows simulated battery curves of five user equipments.
Figure 10A:
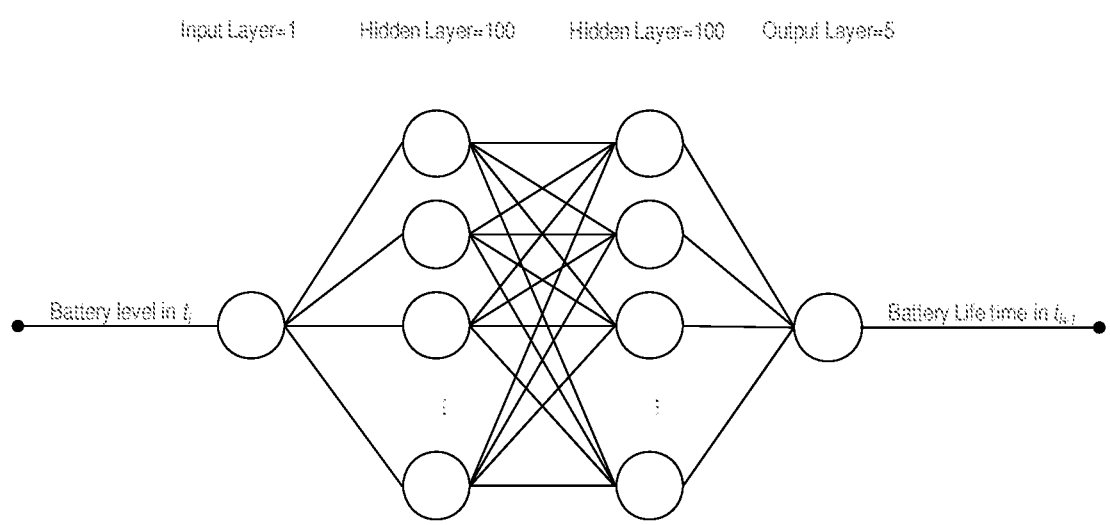
FIGS. 10A-10B are diagrams each showing a forecasting model for use in a simulation test.
Figure 10B:
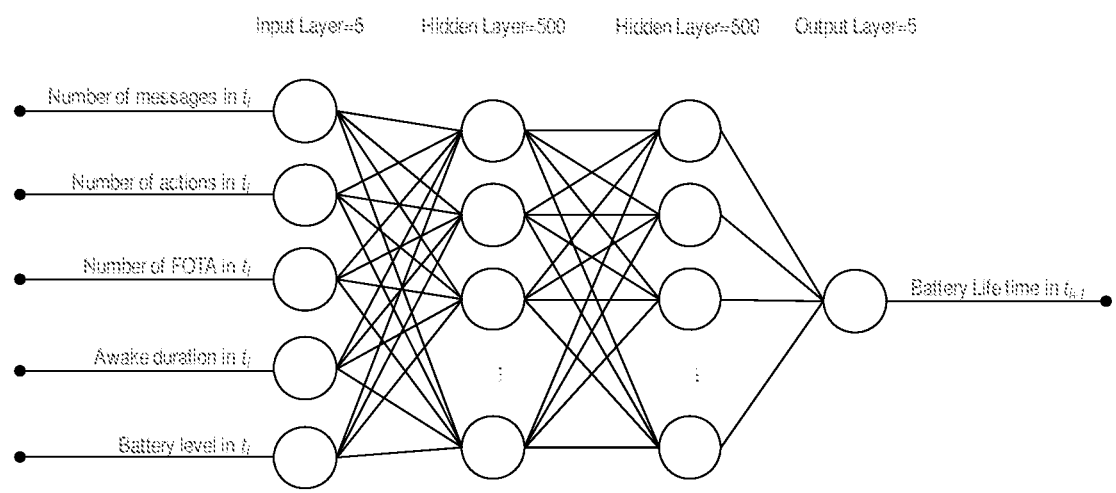

To verify the effectiveness of the above machine learning models, a simulation test has been performed. In this simulation test, the power consumption data of 5 devices of the same device type was generated based on power consumption patterns and some random variables. The power consumption data of each time step included battery level, number of messages, number of actions, number of firmware over-the-air (FOTA) and awake duration. The battery lifetime was calculated as the time steps between the current time window $t_i$ to the time window when the battery level is close to 0%. The simulated battery curves of the 5 devices are shown in FIG. 9.

Figure 11A:
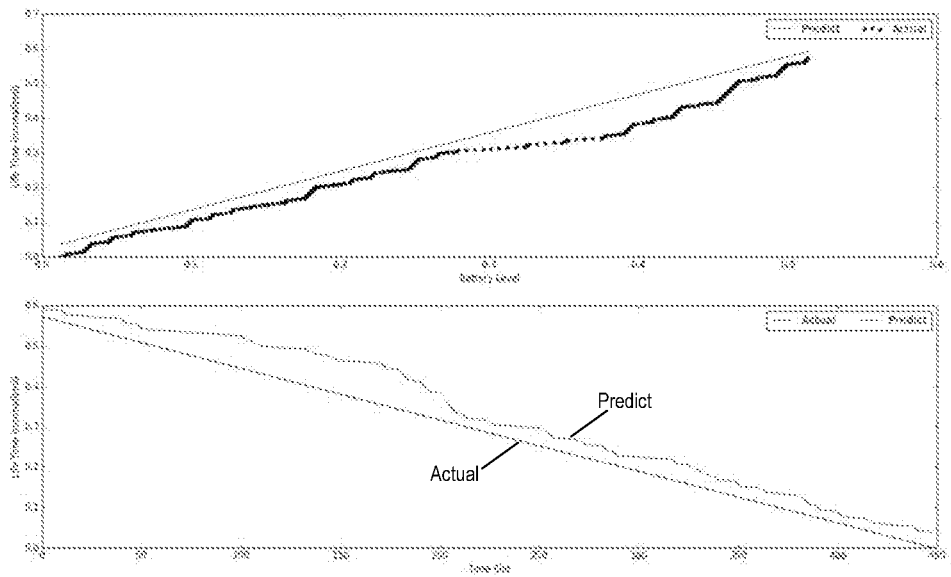
FIGS. 11A-11B are diagrams each showing the evaluation loss in the simulation test.
Figure 11B:
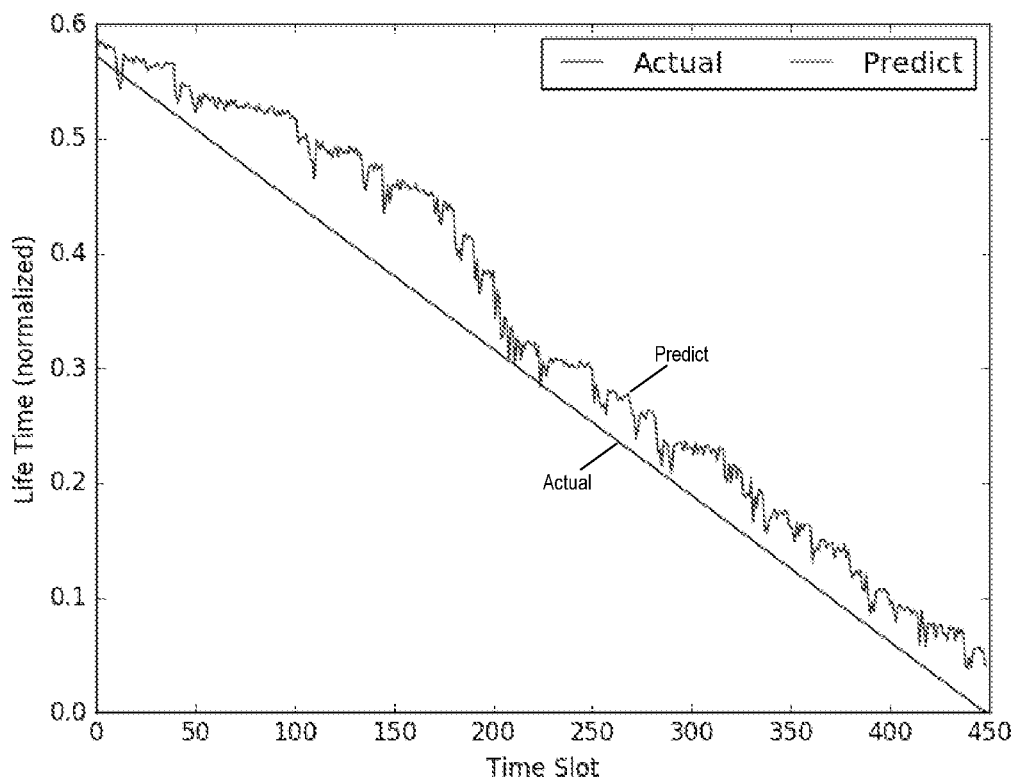

In the simulation test, Tensorflow's DNNRegressor, a deep neural network (DNN), was used as the supervised machine learning algorithm to build two models. One model was a univariate model shown in FIG. 10A and the other model was a multivariate model shown in FIG. 10B. In the univariate model, battery level (normalized) was used as input and battery life time was used as output. This model was used for devices on-boarding for the first time. In the multivariate model, the 5 features (normalized) mentioned above were used as inputs and battery lifetime was used as output. This model was used for devices in operation. The data of 4 devices was used as training data and the data of one device was used for testing. FIG. 11A shows the comparison between the actual and predicted diagrams for the univariate model. As shown in FIG. 11A, the evaluation loss was 0.0027070753. FIG. 11B shows the comparison between the actual and predicted diagrams for the multivariate model. As shown in FIG. 11B, the evaluation loss was 0.0025252893.

Figure 12:
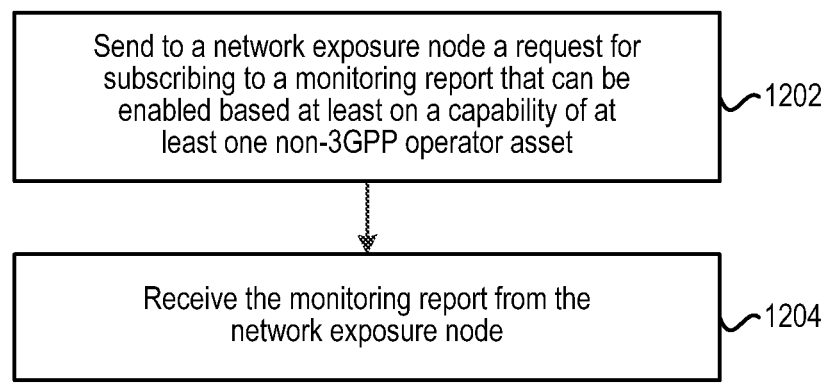
FIG. 12 is a flowchart illustrating a method implemented at a server according to an embodiment of the disclosure.

FIG. 12 is a flowchart illustrating a method implemented at a server according to an embodiment of the disclosure. As described above, the server may take the form of SCS, AS, or any other similar entity. At block 1202, the server sends to a network exposure node a request for subscribing to a monitoring report that can be enabled based at least on a capability of at least one non-3GPP operator asset. Block 1202 corresponds to block 302 and its details are omitted here. At block 1204, the monitoring report is received from the network exposure node. Block 1204 corresponds to block 306 and its details are omitted here.

In the examples described above, the monitoring report is related to a UE. However, the present disclosure is not limited to these examples. As an alternative, the monitoring report may be related to an application which is used for monitoring a UE. For example, in the case of LPWA device, the application may be the one used for monitoring battery lifetime predicted for the LPWA device. The monitoring report may indicate the status of the application.

Figure 13:
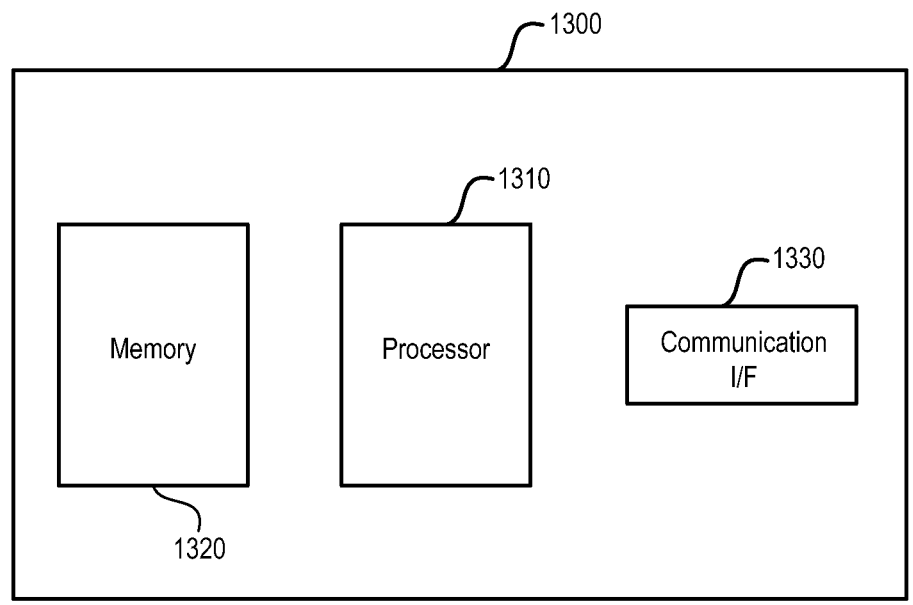
FIG. 13 is a block diagram showing an apparatus suitable for use in practicing some embodiments of the disclosure.

FIG. 13 is a block diagram showing an apparatus suitable for use in practicing some embodiments of the disclosure. For example, any one of the network exposure node, the operator node and the server described above may be implemented through the apparatus 1300. As shown, the apparatus 1300 may include a processor 1310, a memory 1320 that stores a program, and a communication interface 1330 for communicating data with other external devices through wired and/or wireless communication.

The program includes program instructions that, when executed by the processor 1310, enable the apparatus 1300 to operate in accordance with the embodiments of the present disclosure, as discussed above. That is, the embodiments of the present disclosure may be implemented at least in part by computer software executable by the processor 1310, or by hardware, or by a combination of software and hardware.

The memory 1320 may be of any type suitable to the local technical environment and may be implemented using any suitable data storage technology, such as semiconductor based memory devices, flash memory, magnetic memory devices and systems, optical memory devices and systems, fixed memory and removable memory. The processor 1310 may be of any type suitable to the local technical environment, and may include one or more of general purpose computers, special purpose computers, microprocessors, digital signal processors (DSPs) and processors based on multi-core processor architectures, as non-limiting examples.

Figure 14:
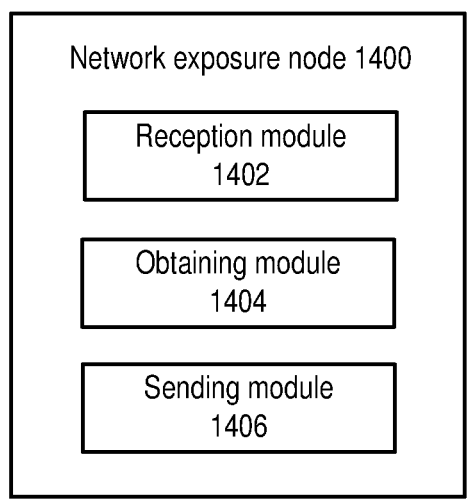
FIG. 14 is a block diagram showing a network exposure node according to an embodiment of the disclosure.

FIG. 14 is a block diagram showing a network exposure node according to an embodiment of the disclosure. As shown, the network exposure node 1400 may comprise a reception module 1402, an obtaining module 1404 and a sending module 1406. The reception module 1402 may be configured to receive from a server a request for subscribing to a monitoring report that can be enabled by an operator node based at least on a capability of at least one non-3GPP operator asset, as described above with respect to block 302. The obtaining module 1404 may be configured to obtain the monitoring report from the operator node, as described above with respect to block 304. The sending module 1406 may be configured to send the monitoring report to the server, as described above with respect to block 306.

Figure 15:
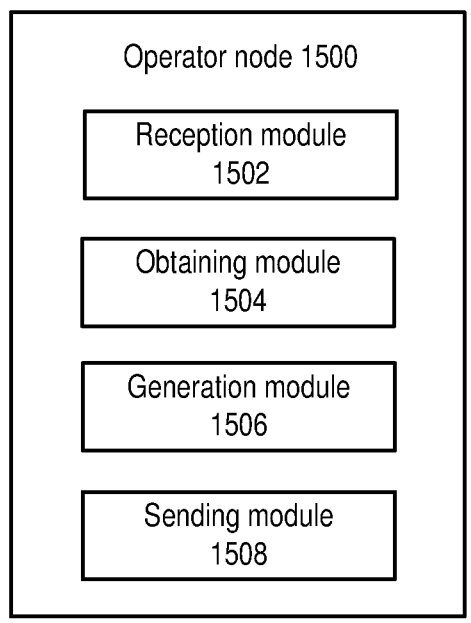
FIG. 15 is a block diagram showing an operator node according to an embodiment of the disclosure.

FIG. 15 is a block diagram showing an operator node according to an embodiment of the disclosure. As shown, the operator node 1500 may comprise a reception module 1502, an obtaining module 1504, a generation module 1506 and a sending module 1508. The reception module 1502 may be configured to receive from a network exposure node a request for subscribing to a monitoring report that can be enabled based at least on a capability of at least one non-3GPP operator asset, as described above with respect to block 402. The obtaining module 1504 may be configured to obtain, from the at least one non-3GPP operator asset, data related to the monitoring report, as described above with respect to block 404. The generation module 1506 may be configured to generate the monitoring report based at least on the obtained data, as described above with respect to block 406. The sending module 1508 may be configured to send the monitoring report to the network exposure node, as described above with respect to block 408.

Optionally, the obtaining module 1504 may comprise a module for obtaining historical power consumption data of a plurality of reference UEs. The obtaining module 1504 may further comprise a module for obtaining current power consumption data of the UE. The generation module 1506 may comprise a module for generating a forecasting model for battery lifetime from the historical power consumption data of the plurality of reference UEs based on machine learning. The generation module 1506 may further comprise a module for determining predicted batter lifetime for the UE based on the forecasting model and the current power consumption data of the UE.

Optionally, the obtaining module 1504 may further comprise a module for obtaining historical power consumption data of the UE. The generation module 1506 may be configured to generate the forecasting model further from the historical power consumption data of the UE based on machine learning.

Figure 16:
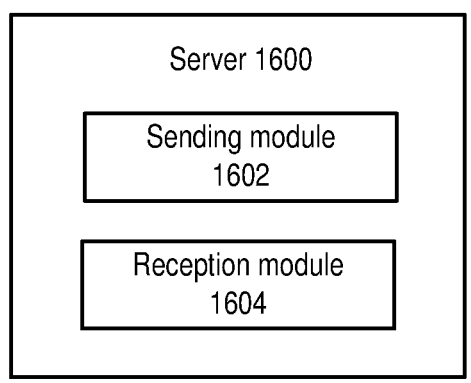
FIG. 16 is a block diagram showing a server according to an embodiment of the disclosure.

FIG. 16 is a block diagram showing a server according to an embodiment of the disclosure. As shown, the server may comprise a sending module 1602 and a reception module 1604. The sending module 1602 may be configured to send to a network exposure node a request for subscribing to a monitoring report that can be enabled based at least on a capability of at least one non-3GPP operator asset, as described above with respect to block 1202. The reception module 1604 may be configured to receive the monitoring report from the network exposure node, as described above with respect to block 1204. Note that the modules described above may be implemented as hardware (such as integrated circuits, field programmable gate arrays (FPGA), or the like), software, or a combination thereof.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a network exposure node, the method comprising:
   receiving from a server a request for subscribing to a monitoring report that is enabled by an operator node, wherein the monitoring report is enabled based at least on a monitoring capability of at least one non-3rd generation partnership project, 3GPP, operator asset;
   obtaining the monitoring report from the operator node; and
   sending the monitoring report to the server.

2. A network exposure node comprising:
   at least one processor; and
   at least one memory, the at least one memory containing instructions executable by the at least one processor, whereby the network exposure node is operative to:
   receive from a server a request for subscribing to a monitoring report that is enabled by an operator node, wherein the monitoring report is enabled based at least on a monitoring capability of at least one non-3rd generation partnership project, 3GPP, operator asset;
   obtain the monitoring report from the operator node; and
   send the monitoring report to the server.

3. The network exposure node according to claim 2, wherein the monitoring report is related to a user equipment, UE.

4. The network exposure node according to claim 3, wherein the monitoring report is related to battery lifetime predicted for the UE.

5. The network exposure node according to claim 4, wherein the request indicates a time threshold, the time threshold being configured so that the monitoring report is triggered when the predicted battery lifetime meets the time threshold.

6. The network exposure node according to claim 4, wherein the monitoring report indicates the current predicted battery lifetime.

7. The network exposure node according to claim 4, wherein the request comprises a data structure "MonitoringEventSubscription" having an attribute "monitoringType" set to "Device Battery Lifetime Prediction"; and
   wherein the monitoring report comprises a data structure "MonitoringEventNotification" having a parameter "predictedDeviceBatteryLifetime" in "monitoringEventReports" data type, the parameter "predictedDeviceBatteryLifetime" being set to the predicted battery lifetime.

8. The network exposure node according to claim 4, wherein the UE is one of:
   a low power wide area, LPWA, device; a narrowband Internet of things, NB-IoT, device;
   and a category-M1, CAT-M1, device.

9. An operator node comprising:
   at least one processor; and
   at least one memory, the at least one memory containing instructions executable by the at least one processor, whereby the operator node is operative to:
   receive from a network exposure node a request for subscribing to a monitoring report, the monitoring reporting being enabled based at least on a monitoring capability of at least one non-3rd generation partnership project, 3GPP, operator asset;
   obtain, from the at least one non-3GPP operator asset, data related to the monitoring report;
   generate the monitoring report based at least on the obtained data; and
   send the monitoring report to the network exposure node.

10. The operator node according to claim 9, wherein the at least one non-3GPP operator asset is one of or any combination of:
    a device management system; a traffic log system; a mobile location based system; and a business or operation supporting system.

11. The operator node according to claim 9, wherein the monitoring report is related to battery lifetime predicted for a user equipment, UE, and the at least one non-3GPP operator asset comprises a device management system and a traffic log system.

12. The operator node according to claim 11, wherein the operator node is operative to obtain, from the at least one non-3GPP operator asset, data relating to the monitoring report by:
    obtaining historical power consumption data of a plurality of reference UEs; and
    obtaining current power consumption data of the UE;
    wherein the operator node is operative to generate the monitoring report based at least on the obtained data, wherein generating the monitoring report comprises:

generating a forecasting model for battery lifetime from the historical power consumption data of the plurality of reference UEs based on machine learning; and determining predicted battery lifetime for the UE based on the forecasting model and the current power consumption data of the UE.

13. The operator node according to claim 12, wherein the operator node is operative to obtain, from the at least one non-3GPP operator asset, data relating to the monitoring report by further:

obtaining historical power consumption data of the UE; and wherein the forecasting model is generated further from the historical power consumption data of the UE based on machine learning.

14. The operator node according to claim 12, wherein an amount of historical power consumption data of the UE is smaller than or equal to a predetermined amount threshold; and wherein the current power consumption data of the UE is a current battery level of the UE.

15. The operator node according to claim 13, wherein an amount of historical power consumption data of the UE is greater than a predetermined amount threshold;

wherein the current power consumption data of the UE comprises a current battery level and a corresponding behavior pattern of the UE; and wherein the historical power consumption data of the UE comprises historical battery levels, corresponding battery usage time values and the corresponding behavior patterns of the UE.

16. The operator node according to claim 15, wherein the behavior pattern of the UE comprises one of or any combination of:

a voltage value in a predetermined time period;

a current value in the predetermined time period;

a number of messages in the predetermined time period;

a number of events in the predetermined time period;

a power saving mode, PSM, duration in the predetermined time period; and a wakeup duration in the predetermined time period.

17. The operator node according to claim 12, wherein the historical power consumption data of a reference UE comprises historical battery levels and corresponding battery usage time values of the reference UE.

18. The operator node according to claim 12, wherein when a time threshold is indicated in the request, at least the determining of the predicted battery lifetime is performed until the predicted battery lifetime meets the time threshold; and wherein when no time threshold is indicated in the request, the determining of the predicted battery lifetime is performed once.

19. A server comprising:

at least one processor; and at least one memory, the at least one memory containing instructions executable by the at least one processor, whereby the server is operative to:

send to a network exposure node a request for subscribing to a monitoring report, the monitoring report being enabled-based at least on a monitoring capability of at least one non-3rd generation partnership project, 3GPP, operator asset; and receive the monitoring report from the network exposure node.

20. The server according to claim 19, wherein the monitoring report is related to battery lifetime predicted for a user equipment, UE.

* * * * *